United States Patent
Mori et al.

(10) Patent No.: US 9,731,652 B2
(45) Date of Patent: Aug. 15, 2017

(54) ALERT SYSTEM FOR USER OF VEHICLE

(71) Applicant: HONDA MOTOR CO., LTD., Tokyo (JP)

(72) Inventors: Takashi Mori, Wako (JP); Motohisa Hirose, Wako (JP); Katsuyasu Yamane, Wako (JP); Masayuki Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/958,039

(22) Filed: Dec. 3, 2015

(65) Prior Publication Data

US 2016/0159279 A1 Jun. 9, 2016

(30) Foreign Application Priority Data

Dec. 5, 2014 (JP) .................................. 2014-246794

(51) Int. Cl.
*B60Q 1/00* (2006.01)
*B60Q 9/00* (2006.01)
*B60R 25/00* (2013.01)

(52) U.S. Cl.
CPC .............. *B60Q 9/001* (2013.01); *B60R 25/00* (2013.01)

(58) Field of Classification Search
CPC ...... G07C 5/008; G07C 5/0808; G07C 5/085; G07C 5/0891; G07C 2009/0092;
(Continued)

(56) References Cited

U.S. PATENT DOCUMENTS 6,650,999 B1 * 11/2003 Brust .................... B60R 25/102
340/932.2
7,187,271 B2 * 3/2007 Nagata ................... B60Q 9/001
340/438
(Continued)

FOREIGN PATENT DOCUMENTS

| JP | 2005-240349 A | 9/2005 |
| JP | 2013-198322 A | 9/2013 |
| JP | 2014-12953 A | 1/2014 |

OTHER PUBLICATIONS

Office Action dated Sep. 6, 2016, issued in counterpart Japanese Patent Application No. 2014-246794. (3 pages).

*Primary Examiner* — Daniel Previl
(74) *Attorney, Agent, or Firm* — Westerman, Hattori, Daniels & Adrian, LLP (57) ABSTRACT

An alert system includes a vehicle that transmits predetermined verification information within a communication range and a portable terminal that performs a predetermined alert operation on receiving the verification information. The portable terminal includes a control part that stores reference status being status of the vehicle and needing no alert operation. The control part regularly receives the verification information within the communication range. The control part determines that an alert operation is necessary when the portable terminal is moved out of the communication range from inside of the communication range and when a result of comparison between the verification information received immediately before the portable terminal is moved out of the communication range and the reference status stored in advance indicates that the verification information and the reference status are different. The control part performs the alert operation when it is determined that the alert operation is necessary.

8 Claims, 3 Drawing Sheets

(58) Field of Classification Search
CPC ...... G07C 2009/00968; G07C 2209/63; G07C 2209/64; G07C 9/00103; G07C 9/00111; G07C 9/00563; G07C 9/00658; B60R 21/0132
USPC ......... 340/438, 457, 457.2, 457.3, 458, 459, 340/460, 461, 539.1, 988, 989, 932.2, 340/825.31, 825.34, 991
See application file for complete search history.

(56) References Cited

U.S. PATENT DOCUMENTS

| | | | | |
|---|---|---|---|---|
| 2002/0089434 | A1* | 7/2002 | Ghazarian | G06Q 10/08 340/988 |
| 2010/0075655 | A1* | 3/2010 | Howarter | B60R 25/2009 455/420 |
| 2013/0281023 | A1* | 10/2013 | Madanarajagopal | H04B 7/00 455/41.3 |

* cited by examiner

FIG. 1

FIG. 2 ated Dec. 5, 2014, entitled "ALERT SYSTEM." The contents of this application are incorporated herein by reference in their entirety.

BACKGROUND

1. Field

The present application relates to an alert system for notifying a user of the status of a vehicle.

2. Description of the Related Art

A conventional forgotten-operation notifying system is known, which includes a vehicle-mounted notification device that communicates and is connected with a portable terminal carried by a user to transmit information on an operation forgotten in a vehicle by the user to the portable terminal via a center or through direct communication (see, for example, Japanese Unexamined Patent Application Publication No. 2005-240349). When in the forgotten-operation notifying system, the portable terminal registered in advance receives such information on the forgotten operation from the vehicle, the portable terminal notifies the user of the information.

In the above-described conventional forgotten-operation notifying system, however, the vehicle-mounted notification device merely performs determination regarding a forgotten operation of a user in accordance with a predetermined determination condition and problems may be caused accordingly, which are that the intention of the user cannot be reflected and that it is thus impossible to properly distinguish the status based on the user's intention from the status based on the forgotten operation. When, so as to deal with such problems, a move of the portable terminal to the outside of the range of the direct communication with the vehicle is used as a condition for starting to determine the presence or absence of a forgotten operation and the notification from the portable terminal to the user is performed via a center, communication may be unsuccessful, depending on the status of the vehicle or the portable terminal. When for example, the vehicle is located in a place where the communication with the center is impossible, such as an underground place, or the portable terminal is left in the vehicle, the notification to the user may be unsuccessful.

SUMMARY

The present application has been made in view of the above-described situation and is aimed at providing an alert system, which properly notifies the user of a fact that a vehicle is in an unfavorable status without any intention of a user while enhancing customer convenience.

To solve the above-described problems and achieve the above-described aim, the present application employs aspects described below. An alert system according to a first aspect of the present application includes: a vehicle-mounted communication device (e.g. a communication unit 41 in an embodiment) that is mounted in a vehicle (e.g. a vehicle 12 in the embodiment) and transmits verification information regarding a predetermined status of the vehicle (first information representing the current status of the vehicle) within a predetermined communication range around the vehicle; and a portable terminal (e.g. a portable terminal 11 in the embodiment) carried by a user and including an alert activation part (e.g. a control part 25 as well as a touch panel 23 and a speaker 24 in the embodiment) that performs a predetermined alert operation on receiving the verification information, the portable terminal further including: a storage part such as a memory device (e.g. the control part 25 which includes the function as the memory device in the embodiment) that stores reference status being status of the vehicle and needing no alert operation (second information representing a predetermined status in which no alert operation is assumed to be necessary); and an alert necessity determining part as an alert necessity determiner (e.g. the control part 25 which includes the function as the alert necessity determining part in the embodiment) that regularly receives the verification information within the communication range, and determines that an alert operation is necessary when a position of the portable terminal is changed from inside of the communication range to outside of the communication range and when a result of comparison between the latest verification information received immediately before the position of the portable terminal is changed to the outside of the communication range and the reference status stored in the storage part indicates that the verification information and the reference status are different from each other, the alert part performing the alert operation when the alert necessity determining part determines that the alert operation is necessary.

According to the alert system of the above-described first aspect, the portable terminal performs the determination regarding the necessity of an alert when the portable terminal is moved out of the communication range, the alert can be conducted only in a situation where the vehicle is highly likely to be in an unfavorable status in spite of no intention of the user, and customer convenience can be enhanced.

In the alert system of a second aspect according to the above-described first aspect, even if the position of the portable terminal is not changed from the inside of the communication range to the outside of the communication range before predetermined time elapses after a satisfaction of a predetermined alighting condition included in the verification information (under which the vehicle is assumed not to be in operation by the user), the alert necessity determining part determines that the alert operation is necessary when a result of comparison between the verification information received immediately before the predetermined time elapses and the reference status stored in the storage part indicates that the verification information and the reference status are different from each other.

According to the above-described second aspect, even if the communication range is expanded, the alert can be performed at a proper timing by setting the predetermined time to a predetermined proper length even when the portable terminal is not moved out of the communication range, such as a case where the vehicle is parked immediately next to the user's home.

In the alert system of a third aspect according to the above-described second aspect, the satisfaction of the alighting condition occurs in status where it is detected that any one of doors of the vehicle is opened while the vehicle is stopped.

According to the above-described third aspect, setting the predetermined time to the predetermined proper length enables an alert to be properly performed when any door is opened and the predetermined alighting condition is satisfied, and when for example, the door is in a half-open door status, which is not caused by the loading or unloading by the user but is occurring in spite of no intention of the user.

An alert system according to a fourth aspect of the present application includes: a vehicle-mounted communication device (e.g. the communication unit 41 in the embodiment) that is mounted in a vehicle (e.g. the vehicle 12 in the embodiment) and transmits predetermined verification information within a predetermined communication range around the vehicle; and a portable terminal (e.g. the portable terminal 11 in the embodiment) carried by a user and including an alert part (e.g. the control part 25 as well as the touch panel 23 and the speaker 24 in the embodiment) that performs a predetermined alert operation on receiving the verification information, the portable terminal further including: a motion sensor (e.g. a motion sensor 22 in the embodiment) that detects whether or not the portable terminal is in a stationary state; a storage part (e.g. also the control part 25 in the embodiment) that stores reference status being status of the vehicle and needing no alert operation; and an alert necessity determining part (e.g. also the control part 25 in the embodiment) that regularly receives the verification information within the communication range, and determines that an alert operation is necessary when a position of the portable terminal is in the communication range and the motion sensor detects that the portable terminal is in the stationary state and when a result of comparison between the verification information received immediately before the position of the portable terminal is changed to the outside of the communication range and the reference status stored in the storage part indicates that the verification information and the reference status are different from each other, the alert part performing the alert operation when the alert necessity determining part determines that the alert operation is necessary.

According to the alert system of the above-described fourth aspect, even if the communication range is expanded, when a living room of the user's home, a store, or the like is located in the communication range near the vehicle, an alert can be performed in a case where the portable terminal is estimated to be put on a stable place, such as a table.

In the alert system of a fifth aspect according to any one of the above-described first to fourth aspects, the portable terminal further includes a display screen (e.g. a display screen 23*a* in the embodiment) that is visually discernible to the user, and in the alert operation, at least one item in which the verification information and the reference status are different from each other according to the result of the comparison performed by the alert necessity determining part is displayed on the display screen so as to be discernible.

According to the above-described fifth aspect, since the user can clearly recognize which item causes a difference from the reference status, the user can immediately judge whether or not any action needs to be taken.

In the alert system of a sixth aspect according to any one of the above-described first to third aspects, the alert necessity determining part determines that the position of the portable terminal is changed from the inside of the communication range to the outside of the communication range when electric field intensity obtained in receiving the verification information at the portable terminal falls below a predetermined threshold, and the electric field intensity represents a time average value of electric field intensity detected in regularly receiving the verification information.

According to the above-described sixth aspect, since it is determined that the portable terminal is positioned outside the communication range by referring to the time average value of the electric field intensity, variations caused by the way in which the user holds the portable terminal or a radio environment around the vehicle can be reduced, and stable determination can be performed at a constant predetermined distance.

In the alert system of a seventh aspect according to the above-described second aspect, the portable terminal further includes a change part as an alert operation adjuster (e.g. the control part 25 and the touch panel 23 which can function and the setting adjuster in the embodiment) that enables the user to change at least one of the reference status, the predetermined time, and a threshold of electric field intensity for specifying the communication range.

According to the above-described seventh aspect, the settings can be oriented more toward the usage or preferences of the user, and customer convenience can be enhanced.

DESCRIPTION OF THE PREFERRED EMBODIMENTS

An alert system 10 according to an embodiment of the present application is described below with reference to the accompanying drawings.

Figure 1:
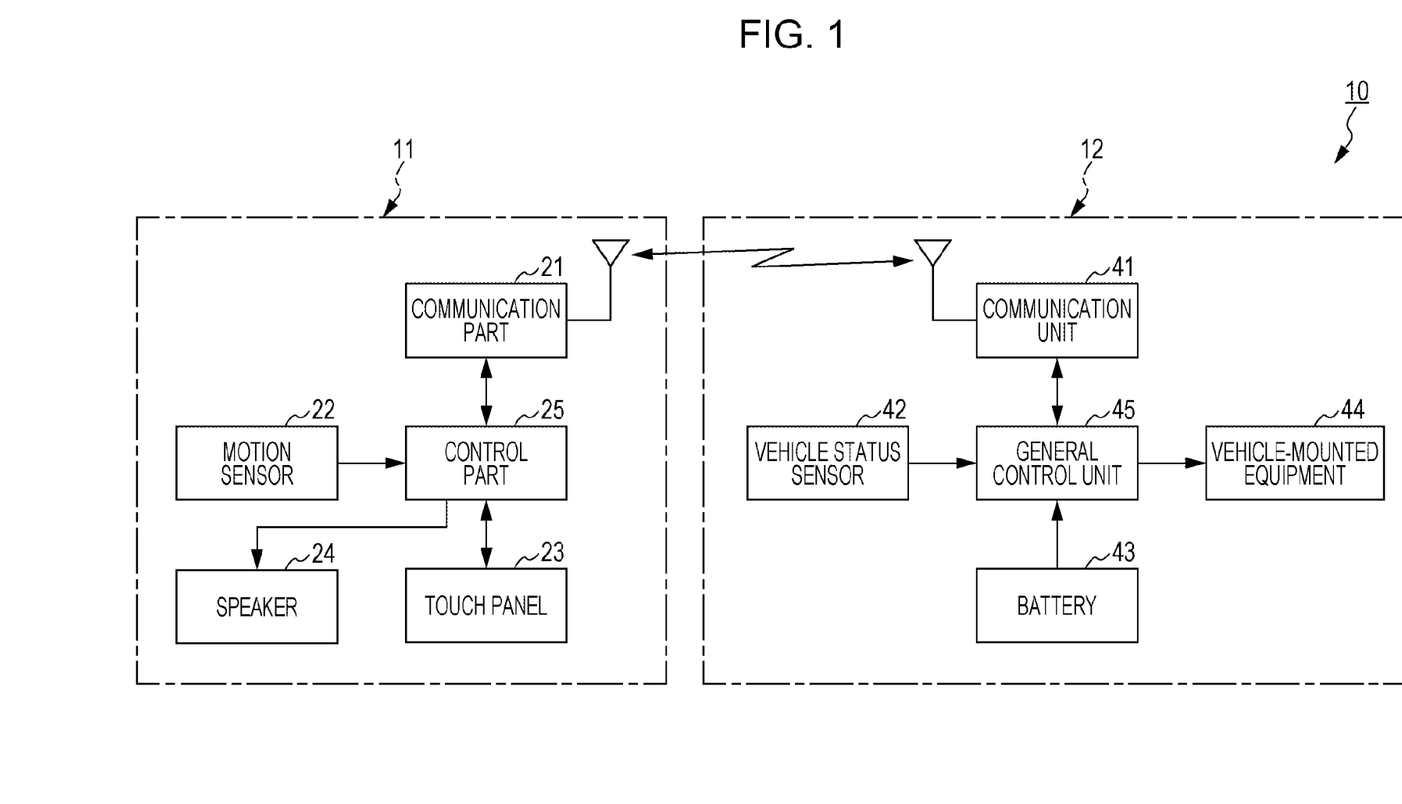
FIG. 1 is a block diagram illustrating a structure of an alert system according to an embodiment of the present application.

As illustrated in FIG. 1, the alert system 10 according to the embodiment includes a portable terminal 11 and a vehicle 12.

The portable terminal 11 is a remote control device that a driver of the vehicle 12 carries. For example, the portable terminal 11 performs mutual radio communication with the vehicle 12 via short-distance radio communication, such as Bluetooth (registered trademark), or wireless local access network (LAN), such as Wi-Fi (registered trademark).

The portable terminal 11 includes a communication part 21, a motion sensor 22, a touch panel 23, a speaker 24, and a control part 25.

The communication part 21 performs radio communication with a communication unit 41 of the vehicle 12, which is described below, in accordance with a signal from the control part 25.

The motion sensor 22 may be an acceleration sensor or a gyro sensor for example, and detects whether or not the portable terminal 11 has moved and outputs a signal regarding whether or not the portable terminal 11 is in a stationary state.

The touch panel 23 displays the status of the vehicle 12, an operation screen for operating a function of the vehicle 12 from the outside, or the like. The touch panel 23 accepts a touching operation by a finger of a user, which is input onto the operation screen, and outputs a command signal for commanding an operation of the vehicle 12.

In accordance with a signal from the control part 25, the speaker 24 replays and outputs data of various voices or signal sounds stored in the control part 25. For example, the speaker 24 causes a warning sound that a driver who holds the portable terminal 11 can recognize.

The control part 25 performs general control over the operations of the portable terminal 11. The control part 25 includes a processor, such as a central processing unit (CPU), read-only memory (ROM), which stores a program, and random-access memory (RAM), which temporarily stores data. The control part 25 stores various programs.

The control part 25 mutually communicates with the vehicle 12 in predetermined intermittent cycles in a predetermined communication range provided around the vehicle 12 after the connection of the radio communication with the vehicle 12 is established. The control part 25 regularly receives a signal that includes status information of the vehicle 12 through the mutual communication with the vehicle 12. The control part 25 stores the latest status information of the vehicle 12 while updating the stored status information of the vehicle 12. When the communication part 21 receives any of various signals transmitted from the vehicle 12 in the regular mutual communication with the vehicle 12, the control part 25 controls the display of a display screen 23a of the touch panel 23 and the operation of the speaker 24 in accordance with the received signal. When an operation signal for operating a function of the vehicle 12 in accordance with a touching operation of the user onto the touch panel 23 is output from the touch panel 23, the control part 25 causes the operation signal to be transmitted from the communication part 21 in the regular mutual communication with the vehicle 12.

When the portable terminal 11 moves from the inside of the predetermined communication range provided around the vehicle 12 to the outside of the predetermined communication range in a connected state of the radio communication with the vehicle 12, the control part 25 disconnects the radio communication with the vehicle 12. The control part 25 detects the position of the portable terminal 11 relative to the predetermined communication range in accordance with electric field intensity detected in the regular mutual communication with the vehicle 12 performed in the predetermined intermittent cycles. When for example, a time average value of the electric field intensity regularly detected is smaller than a predetermined threshold, the control part 25 determines that the position of the portable terminal 11 is changed from the inside of the predetermined communication range to the outside of the communication range.

When in the connected state of the radio communication with the vehicle 12, the communication part 21 receives predetermined verification information transmitted from the vehicle 12, the control part 25 controls at least one of the display of the display screen 23a of the touch panel 23 and the operation of the speaker 24, and performs a predetermined alert operation. The control part 25 stores reference status in advance, which is status of the vehicle 12 and needs no alert operation. When the position of the portable terminal 11 is changed from the inside of the predetermined communication range to the outside of the communication range and when a result of comparison between the verification information received immediately before the position of the portable terminal 11 is changed to the outside of the communication range and the reference status stored in advance indicates that the verification information and the reference status are different from each other, the control part 25 determines that an alert operation is necessary. On determining that the alert operation is necessary, the control part 25 performs the alert operation through at least one of the display of the display screen 23a of the touch panel 23 and the operation of the speaker 24.

When the position of the portable terminal 11 is in the predetermined communication range and the motion sensor 22 detects that the portable terminal 11 is in a stationary state, and when a result of comparison between the verification information received immediately before the stationary state of the portable terminal 11 is detected and the reference status stored in advance indicates that the verification information and the reference status are different from each other, the control part 25 determines that an alert operation is necessary.

When in the connected state of the radio communication with the vehicle 12, the communication part 21 receives predetermined verification information transmitted from the vehicle 12 and the verification information includes information indicating satisfaction of a predetermined alighting condition, the control part 25 determines whether or not predetermined time elapses after the satisfaction of the predetermined alighting condition. When a result of comparison between the verification information received immediately before the predetermined time elapses and the reference status stored in advance indicates that the verification information and the reference status are different from each other, the control part 25 determines that an alert operation is necessary even if the position of the portable terminal 11 is not changed from the inside of the communication range to the outside of the communication range before the predetermined time elapses after the satisfaction of the predetermined alighting condition. The satisfaction of the predetermined alighting condition occurs in status where it is detected that any one of the doors of the vehicle 12 is opened while the vehicle 12 is stopped.

Figure 2:
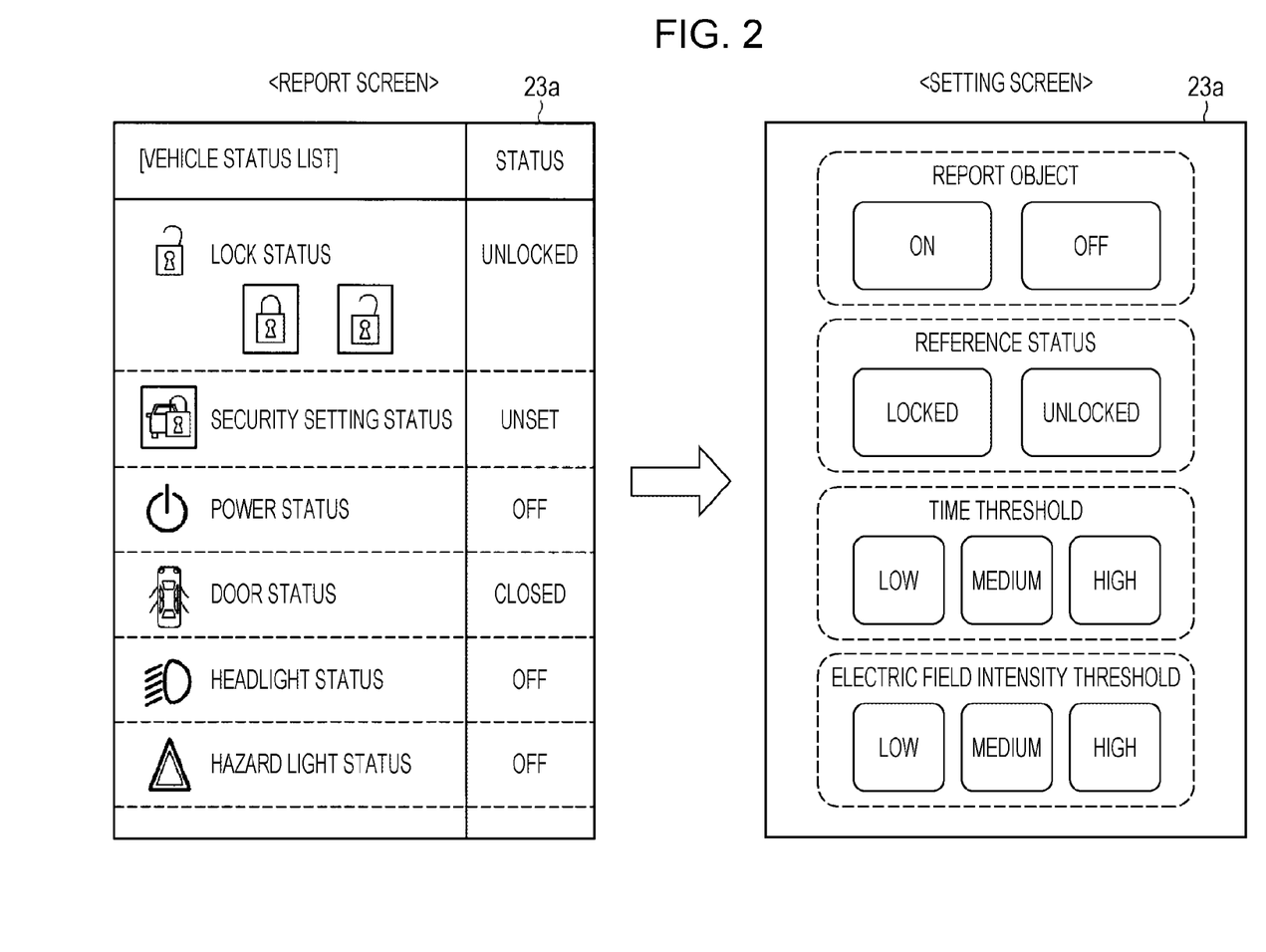
FIG. 2 illustrates examples of an alert screen and a setting screen displayed on a display screen of a portable terminal of the alert system according to the embodiment of the present application.

When the control part 25 determines that the alert operation is necessary, the control part 25 causes an alert screen, where at least one item in which the verification information and the reference status stored in advance are different from each other when compared is discernible, to be displayed on the display screen 23a of the touch panel 23. In FIG. 2, for example, the control part 25 causes the items in which the received verification information and the reference status stored in advance are different to be highlighted on the alert screen that displays a plurality of items in list form as alert objects.

Examples of the items displayed as the alert objects on the alert screen illustrated in FIG. 2 include the locked or unlocked status of a door lock unit, the set or unset status of predetermined security, the on or off status of power, the open or closed status of the doors, the on or off status of the headlights, and the on or off status of the hazard lights. As the items in which the received verification information and the reference status stored in advance are different, the items of the locked or unlocked status of the door lock unit and the set or unset status of the predetermined security are highlighted.

The control part 25 causes at least one of various settings for each of the plurality of items corresponding to various kinds of status of the vehicle 12 to be presented on a setting screen displayed on the display screen 23a of the touch panel 23 so that the at least one of the various settings can be changed. For example, the various settings relate to the selection regarding whether to set the item as an alert object, the reference status stored in advance, predetermined time as the time elapsed after the satisfaction of the predetermined alighting condition, that is a time threshold, and an electric field intensity threshold for setting the communication range around the vehicle 12.

On the alert screen illustrated in FIG. 2, with regard to the item of the locked or unlocked status of the door lock unit, the user can change the settings related to the selection regarding whether to set the item as the alert object, the selection between the locked status and the unlocked status, which is set as the reference status, the selection among "low", "medium", and "high", which is set as the time threshold, and the selection among "low", "medium", and "high", which is set as the electric field intensity threshold.

The vehicle 12 includes the communication unit 41, a vehicle status sensor 42 for the various kinds of status of the vehicle 12, the battery 43, vehicle-mounted equipment 44, and a general control unit 45. The communication unit the vehicle status sensor 42, the battery 43, and the vehicle-mounted equipment 44 are connected to the general control unit 45 via, for example, a controller area network (CAN), which is a versatile vehicle-mounted communication network, so as to be able to communicate with each other.

The communication unit 41 performs radio communication with the communication part 21 of the portable terminal 11 in accordance with a signal from the general control unit 45.

The vehicle status sensor 42 is, for example, a sensor that outputs a signal regarding various kinds of status of the vehicle 12. Examples of the vehicle status sensor 42 include an ignition switch, a door lock status sensor, a door switch, a communication status sensor, and a switch of the vehicle-mounted equipment 44. The ignition switch outputs a signal regarding the presence or absence of an operation of a travel driving source of the vehicle 12, such as an internal combustion engine or a motor. The door lock status sensor outputs a signal regarding the locked or unlocked status of the door lock unit provided in the doors of the vehicle 12. The door switch outputs a signal regarding the open or closed status of the doors of the vehicle 12. The communication status sensor outputs a signal regarding an operation mode (e.g. the sleeping or woken status) of a vehicle-mounted communication network, such as a CAN communication line, which is a versatile communication line. The switch of the vehicle-mounted equipment 44 outputs a signal regarding the presence or absence of an operation of the vehicle-mounted equipment 44, such as an air conditioner.

The battery 43 supplies power in the vehicle 12.

The vehicle-mounted equipment 44 may be, for example, various devices including the door lock unit, the air conditioner, a display device, and a speaker.

The general control unit 45 performs general control over the vehicle 12. The general control unit 45 includes a processor, such as a CPU, ROM that stores a program, and RAM that temporarily stores data.

The general control unit 45 mutually communicates with the portable terminal 11 in the predetermined intermittent cycles after the connection of the radio communication with the portable terminal 11 is established. The general control unit 45 regularly transmits a signal that includes the status information of the vehicle 12 through the mutual communication with the portable terminal 11.

Examples of the status information of the vehicle 12 include information regarding the on or off status of the ignition switch, the locked or unlocked status of the door lock unit, the open or closed status of a door, and the sleeping or woken status of the communication unit 41, the power-saving or normal status of the vehicle-mounted communication network, and the on or off status of the power. The status information of the vehicle 12 includes information regarding the satisfaction of the predetermined alighting condition. The satisfaction of the predetermined alighting condition occurs in, for example, the status where it is detected that any of the doors of the vehicle 12 is opened while the vehicle 12 is stopped.

The alert system 10 according to the embodiment includes the above-described structure, and examples of operations of the alert system 10 are now described.

The first operation example of the alert system 10 is described below. In the first operation example, in the connected state of the radio communication with the vehicle 12, the portable terminal 11 is moved from the inside of the communication range around the vehicle 12 to the outside of the communication range.

When the time average value of the electric field intensity regularly detected is smaller than the predetermined threshold, the control part 25 of the portable terminal 11 determines that the position of the portable terminal 11 is changed from the inside of the predetermined communication range to the outside of the communication range. When the position of the portable terminal 11 is moved out of the communication range, the control part 25 disconnects the radio communication with the vehicle 12. The control part 25 determines that an alert operation is necessary when a result of comparison between the verification information received from the vehicle 12 immediately before the position of the portable terminal 11 is changed to the outside of the communication range and the reference status stored in advance indicates that the verification information and the reference status are different from each other.

The second operation example of the alert system 10 is described below. In the second operation example, the portable terminal 11 is positioned in the communication range around the vehicle 12 in the connected state of the radio communication with the vehicle 12. Then, the predetermined time elapses after the satisfaction of the predetermined alighting condition included in the verification information received by the portable terminal 11 from the vehicle 12.

When the verification information transmitted from the vehicle 12 includes the information indicating the satisfaction of the predetermined alighting condition, the control part 25 of the portable terminal 11 determines whether or not the predetermined time, such as several tens of seconds, elapses after the satisfaction of the predetermined alighting condition. The control part 25 determines that an alert operation is necessary when a result of comparison between the verification information received immediately before the predetermined time elapses and the reference status stored in advance indicates that the verification information and the reference status are different from each other.

The third operation example of the alert system 10 is described below. In the third operation example, the portable terminal 11 is positioned in the communication range around the vehicle 12 in the connected state of the radio communication with the vehicle 12. The motion sensor 22 detects that the portable terminal 11 is in the stationary state.

The control part 25 of the portable terminal 11 determines whether or not the motion sensor 22 detects that the portable terminal 11 is in the stationary state. The control part 25 determines that an alert operation is necessary when a result of comparison between the verification information received immediately before the portable terminal 11 enters the stationary state and the reference status stored in advance indicates that the verification information and the reference status are different from each other.

As described above, since in the alert system 10 according to the embodiment, the portable terminal 11 performs the determination regarding the necessity of an alert when the portable terminal 11 is moved out of the communication range, the alert can be conducted only in a situation where the vehicle 12 is highly likely to be in an unfavorable status in spite of no intention of the user, and customer convenience can be enhanced.

Furthermore, since the portable terminal 11 performs the determination regarding the necessity of an alert even when the portable terminal 11 is not moved out of the communication range before the predetermined time elapses after the satisfaction of the predetermined alighting condition, the alert can be performed at a proper timing by setting the predetermined time to a predetermined proper length. Even when the portable terminal 11 is not moved out of the communication range after the alighting from the vehicle, such as a case where the communication range is expanded or a case where the vehicle is parked immediately next to the user's home, the alert can be performed at a proper timing.

In addition, setting the predetermined time to the predetermined proper length enables an alert to be properly performed when any door is opened and the predetermined alighting condition is satisfied, and when for example, the door is in a half-open door status, which is not caused by the loading or unloading by the user but is occurring in spite of no intention of the user.

Also, since the portable terminal 11 performs the determination regarding the necessity of an alert when the portable terminal 11 is in a stationary state even though the portable terminal 11 is not moved out of the communication range, the alert can be performed properly in a case where the vehicle 12 is in an unfavorable status in spite of no intention of the user. For example, when the communication range is expanded or when a living room of the user's home, a store, or the like is located in the communication range near the vehicle 12, an alert can be performed in a case where the portable terminal 11 is estimated to be put on a stable place, such as a table.

Furthermore, since the user can clearly recognize which item causes a difference from the reference status, the user can immediately judge whether or not any action needs to be taken.

In addition, since the control part 25 of the portable terminal 11 determines that the portable terminal 11 is positioned outside the communication range by referring to the time average value of the electric field intensity, variations caused by the way in which the user holds the portable terminal 11 or a radio environment around the vehicle 12 can be reduced, and stable determination can be performed at a constant predetermined distance.

Moreover, since at least one of the various settings can be changed using the setting screen displayed on the display screen 23a of the touch panel 23, the settings can be oriented more toward the usage or preferences of the user, and customer convenience can be enhanced.

Variations of the above-described embodiment are described below.

Although in the above-described embodiment, the control part 25 causes the items in which the received verification information and the reference status stored in advance are different to be highlighted while the plurality of items are displayed in list form as the alert objects, the display manner is not limited to FIG. 2.

Figure 3:
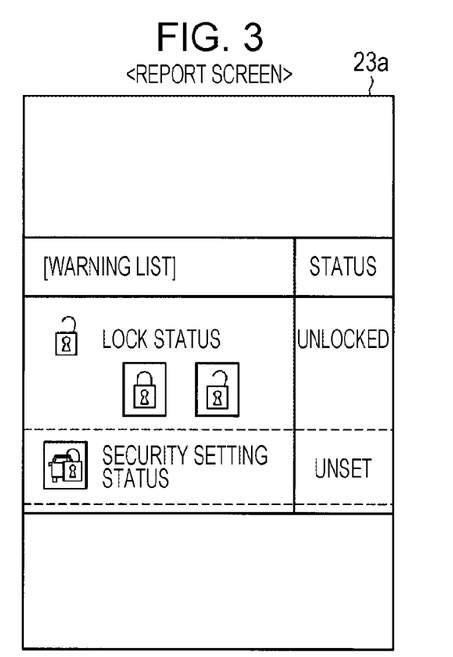
FIG. 3 illustrates an example of an alert screen displayed on a display screen of a portable terminal of an alert system according to a variation of the embodiment of the present application.
Figure 4:
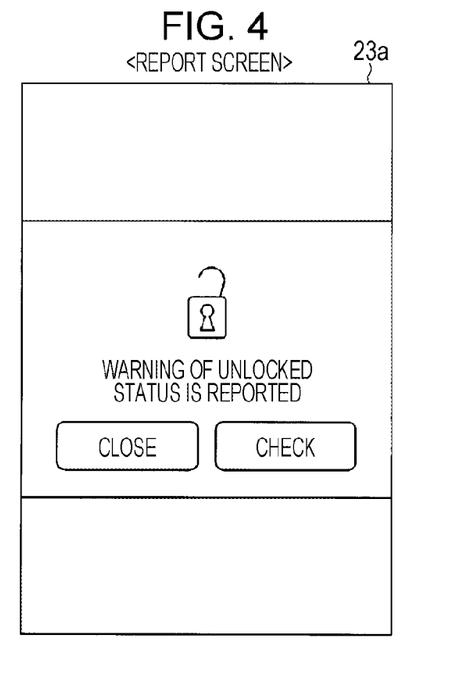
FIG. 4 illustrates an example of an alert screen displayed on a display screen of a portable terminal of an alert system according to a variation of the embodiment of the present application.

As illustrated in FIG. 3 or 4, the control part 25 may cause only the item or items in which the received verification information and the reference status stored in advance are different to be displayed from among the plurality of items that are the alert objects.

In the above-described embodiment, even when the portable terminal 11 is moved out of the communication range of the vehicle 12 or the motion sensor 22 detects that the portable terminal 11 is in the stationary state in the communication range of the vehicle 12, the control part 25 may skip an alert, depending on the current position of the portable terminal 11.

The control part 25 may store information on the position of the user's home and determine whether or not the current position detected by a positioning signal system mounted in the portable terminal 11, such as a global positioning system (GPS), matches the position of the user's home. When the control part 25 detects that the current position of the portable terminal 11 matches the position of the user's home, the control part 25 may skip an alert even in a case where the portable terminal 11 is moved out of the communication range or a case where the portable terminal 11 enters the stationary state in the communication range.

The embodiment of the present application is presented as an example and is not intended to limit the scope of the present application. The embodiment and the variations thereof may be implemented in various other forms and may undergo various omissions, replacements, or changes within the scope not departing from the gist of the present application. The embodiment and the variations thereof are included within the scope or gist of the present application and are also included within the literal or equivalent scope of the claims.

What is claimed is:

1. An alert system for a user of a vehicle, comprising:
a vehicle-mounted communication device mounted in the vehicle and transmits first information representing a current status of the vehicle within a predetermined communication range around the vehicle; and
a portable terminal carried by the user and configured to receive the first information from the vehicle-mounted communication device, the portable terminal comprising:
an alarm device that performs a predetermined alert operation to notify the user of the current status of the vehicle upon receiving the first information;
a memory device that stores second information representing a predetermined status of the vehicle in which no alert operation is assumed to be necessary; and
a controller comprising an alert necessity determiner that (i) regularly receives the first information within the communication range and stores the latest first information while updating the stored first information, (ii) detects whether a position of the portable terminal is changed from inside of the communication range to outside of the communication range, and (iii) when the position of the portable terminal is changed from the inside of the communication range to the outside the communication range, compares the second information with the latest first information received immediately before the position of the portable terminal is changed to the outside of the communication range,
wherein based on a result of said comparison, the alert necessity determiner determines that the alert operation is necessary when the current status of the vehicle represented by the latest first information received immediately before the position of the portable terminal is changed to the outside of the communication range is different from the predetermined status of the vehicle represented by the stored second information.

2. The alert system according to claim 1, wherein the alert necessity determiner is further configured to detect based on the first information whether an predetermined alighting condition under which the vehicle is assumed not to be in operation by the user is satisfied, and to compare the second information with the first information received immediately before a predetermined time elapses after the predetermined alighting condition is satisfied, wherein the alert necessity determiner determines that the alert operation is necessary when the current status of the vehicle represented by the first information received immediately before the predetermined time elapses is different from the predetermined status of the vehicle stored in the second information, regardless of the position of the portable terminal.

3. The alert system according to claim 2, wherein the first information comprises information as to whether any one of doors of the vehicle is opened while the vehicle is stopped, and the alert necessity determiner determines that the alighting condition is satisfied when it is detected from the first information that any one of doors of the vehicle is opened while the vehicle is stopped.

4. The alert system according to claim 2, wherein the portable terminal further comprises an alert operation adjuster that enables the user to change at least one of the predetermined status in the second information and the predetermined time.

5. The alert system according to claim 1, wherein the first and second information comprise items representing the status of the vehicle,
the portable terminal further comprises a display screen that is visually discernible to the user, and
in the alert operation, the display screen displays at least one of the items which is different between the first information and the second information according to the result of the comparison performed by the alert necessity determiner.

6. The alert system according to claim 1, wherein the alert necessity determiner determines that the position of the portable terminal is changed from the inside of the communication range to the outside of the communication range when electric field intensity detected in the communication receiving the first information at the portable terminal falls below a predetermined threshold, and the electric field intensity represents a time average value of electric field intensity detected in the communication regularly receiving the first information.

7. The alert system according to claim 6, wherein the portable terminal further comprises a setting adjuster that enables the user to change the predetermined threshold of the electric field intensity for defining the communication range.

8. An alert system for a user of a vehicle, comprising:
a vehicle-mounted communication device mounted in the vehicle and transmits first information representing a current status of the vehicle within a predetermined communication range around the vehicle; and
a portable terminal carried by the user and configured to receive the first information from the vehicle-mounted communication device, the portable terminal comprising:
an alarm device that performs a predetermined alert operation to notify the user of the current status of the vehicle upon receiving the first information;
a motion sensor that detects whether or not the portable terminal is in a stationary state;
a memory device that stores second information representing a predetermined status of the vehicle in which no alert operation is assumed to be necessary; and
a controller comprising an alert necessity determiner that (i) regularly receives the first information within the communication range and stores the latest first information while updating the stored first information, (ii) detects whether a position of the portable terminal is in the communication range, (iii) compares the latest first information with the second information when it is detected that the position of the portable terminal is in the communication range and that the portable terminal is in the stationary state, and (iv) determines that the alert operation is necessary when the current status of the vehicle represented by the latest first information is different from the predetermined status of the vehicle represented by the stored second information.

* * * * *